US008344316B2

(12) United States Patent
Green et al.

(10) Patent No.: US 8,344,316 B2
(45) Date of Patent: Jan. 1, 2013

(54) METHOD OF AVOIDING SPACE CHARGE SATURATION EFFECTS IN AN ION TRAP

(75) Inventors: Martin Raymond Green, Cheshire (GB); Jason Lee Wildgoose, Stockport (GB)

(73) Assignee: Micromass UK Limited, Manchester (GB)

( * ) Notice: Subject to any disclaimer, the term of this patent is extended or adjusted under 35 U.S.C. 154(b) by 0 days.

(21) Appl. No.: 12/997,347

(22) PCT Filed: Jun. 8, 2009

(86) PCT No.: PCT/GB2009/001434

§ 371 (c)(1), (2), (4) Date: Mar. 3, 2011

(87) PCT Pub. No.: WO2009/150410

PCT Pub. Date: Dec. 17, 2009

(65) Prior Publication Data

US 2011/0303838 A1 Dec. 15, 2011

Related U.S. Application Data

(60) Provisional application No. 61/078,827, filed on Jul. 8, 2008.

(30) Foreign Application Priority Data

Jun. 10, 2008 (GB) .................................. 0810599.1

(51) Int. Cl.
*H01J 49/26* (2006.01)
*H01J 49/42* (2006.01)
*B01D 59/44* (2006.01)

(52) U.S. Cl. ........................................................ 250/282

(58) Field of Classification Search .................. 250/281, 250/282, 283, 292, 288
See application file for complete search history.

(56) References Cited

U.S. PATENT DOCUMENTS

| | | | | |
|---|---|---|---|---|
| 4,771,172 | A | 9/1988 | Weber-Grabau et al. | |
| 5,300,772 | A | 4/1994 | Buttrill, Jr. | |
| 5,572,022 | A | 11/1996 | Schwartz et al. | |
| 6,627,876 | B2 | 9/2003 | Hager | |
| 6,787,760 | B2 | 9/2004 | Belov et al. | |
| 7,071,464 | B2 * | 7/2006 | Reinhold | 250/282 |
| 7,947,948 | B2 * | 5/2011 | Schwartz | 250/283 |
| 2009/0173877 | A1 | 7/2009 | Bateman et al. | |

FOREIGN PATENT DOCUMENTS

DE 19930894 1/2001

(Continued)

OTHER PUBLICATIONS

Schwartz, Jae C. et al, A Two-Dimensional Quadrupole Ion Trap Mass Spectrometer, American Society for Mass Spectrometry, 2002, pp. 659-669, vol. 13, Elsevier Sciencce Inc.

(Continued)

*Primary Examiner* — Nikita Wells
(74) *Attorney, Agent, or Firm* — Diederiks & Whitelaw, PLC

(57) ABSTRACT

A mass spectrometer includes a first ion trap arranged upstream of an analytical second ion trap. The charge capacity of the first ion trap is set at a value such that if all the ions stored within the first ion trap up to the charge capacity limit of the first ion trap are then transferred to the second ion trap, then the analytical performance of the second ion trap is not substantially degraded due to space charge effects.

15 Claims, 10 Drawing Sheets

FOREIGN PATENT DOCUMENTS

| | | |
|---|---|---|
| GB | 2455386 | 6/2009 |
| JP | 2008108739 | 5/2008 |
| WO | 2004068523 | 8/2004 |
| WO | 2006129083 | 12/2006 |
| WO | 2009150410 | 12/2009 |

OTHER PUBLICATIONS

Form PCT/ISA/210, WO, Dec. 15, 2009, Int'l Written Opinion.
Form PCT/ISA/220, WO, Dec. 15, 2009, Int'l Search Report.

* cited by examiner

METHOD OF AVOIDING SPACE CHARGE SATURATION EFFECTS IN AN ION TRAP

CROSS REFERENCE TO RELATED APPLICATIONS

This application is the U.S. Nationalization of International Application No. PCT/GB09/001434, filed on Jun. 8, 2009, which claims benefit of, and priority to, U. S. Provisional Patent Application No. 61/078,827, filed Jul. 8, 2008, and United Kingdom Patent Application No. 0810599.1, filed Jun. 10, 2008. The entire contents of these applications are incorporated herein by reference.

BACKGROUND OF THE INVENTION

The present invention relates to an ion trap, a mass spectrometer, a method of trapping ions and a method of mass spectrometry.

Ion trapping techniques are well established in the field of mass spectrometry. Commercially available three dimensional Paul ion traps and linear geometry ion traps (LIT) based upon a quadrupole rod structure provide a powerful and relatively inexpensive tool for many types of mass spectrometry. Ions are trapped with these devices by inhomogeneous fields modulated at radio frequencies (RF confinement). DC trapping potentials may also be used. Mass selective axial or radial ejection may be achieved by a variety of different techniques. However, to varying degrees, conventional commercial ion traps suffer from limited dynamic range due to the onset of space charge saturation effects at high ion population density.

Space charge saturation in an analytical ion trap is characterised by a loss in analytical performance such as mass resolution, mass measurement precision or accuracy and precision of quantitation and in spectrum dynamic range.

Space charge saturation effects in a conventional commercial linear quadrupole ion trap can become significant for ion populations comprising approximately 30,000 charges. However, in normal operation, linear quadrupole ion traps are capable of trapping much larger ion populations even though analytical performance will be compromised. The total charge capacity of such an ion trap may be several orders of magnitude higher than the space charge limit for acceptable analytical performance.

Various methods are known which attempt to control or limit the total charge entering an analytical ion trap. The conventional methods generally require a pre-scan in which a measurement is made of the composition of the incoming ion beam over a fixed period of time. The amount of signal recorded in the pre-scan is then used to estimate the time for which the incoming ion beam should be allowed to fill the analytical ion trap such that the population of ions does not exceed a target value. However, during the time taken to perform a Pre-scan and to perform an analytical scan of the ion trap, incoming ions are lost and hence the duty cycle of the experiment and overall sensitivity is reduced.

In addition, during a pre-scan an estimate of the total charge is generally made from the amplitude of the detected signal. However, the amplitude response of the detector may not be linear for ions having differing charge states and masses. Therefore, for populations including highly charged species the total charge may be underestimated using conventional techniques. The level at which space charge can compromise performance is generally dependent upon the total charge in the ion trap and not necessarily upon the number of ions in the ion trap.

It is desired to provide an improved ion trapping arrangement.

SUMMARY OF THE INVENTION

According to an aspect of the present invention there is provided a mass spectrometer comprising:

a first ion trap and a second ion trap arranged downstream of the first ion trap; and a control system which is arranged and adapted: (i) to determine when a first charge capacity of the first ion trap is approached or exceeded; and then (ii) to transfer at least some or all ions stored within the first ion trap to the second ion trap.

According to an embodiment:

(i) the first ion trap and/or the second ion trap comprise a quadrupole, hexapole or octapole rod set ion trap, a linear or 2D ion trap, a 3D ion trap comprising a central ring electrode and two end-cap electrodes, or a mass selective rod set ion trap; and/or (ii) the first ion trap and/or the second ion trap comprise an ion tunnel ion trap comprising a plurality of electrodes, each electrode comprising one or more apertures through which ions are transmitted in use; and/or (iii) the first ion trap and/or the second ion trap comprise an ion guide comprising a plurality of planar electrodes arranged generally in the plane of ion transmission, wherein the plurality of planar electrodes are axially segmented.

According to an embodiment:

(a) the first charge capacity is set at: (i) <10000 charges; (ii) 10000-15000 charges; (iii) 15000-20000 charges; (iv) 20000-25000 charges; (v) 25000-30000 charges; (vi) 30000-35000 charges; (vii) 35000-40000 charges; (viii) 40000-45000 charges; (ix) 45000-50000 charges; and (x) >50000 charges; and/or (b) the second ion trap has a second charge capacity, wherein the second charge capacity is set at: (i) <10000 charges; (ii) 10000-15000 charges; (iii) 15000-20000 charges; (iv) 20000-25000 charges; (v) 25000-30000 charges; (vi) 30000-35000 charges; (vii) 35000-40000 charges; (viii) 40000-45000 charges; (ix) 45000-50000 charges; and (x) >50000 charges; and/or (c) the second ion trap has a second charge capacity, wherein the ratio of the second charge capacity to the first charge capacity is selected from the group consisting of: (i) >1; (ii) 1-1.5; (iii) 1.5-2.0; (iv) 2.0-2.5; (v) 2.5-3.0; (vi) 3.0-3.5; (vii) 3.5-4.0; (viii) 4.0-4.5; (ix) 4.5-5.0; (x) 5.0-6.0; (xi) 6.0-7.0; (xii) 7.0-8.0; (xiii) 8.0-9.0; (xiv) 9.0-10.0; and (xv) >10.0.

In a mode of operation an axial DC potential barrier and/or an axial pseudo-potential barrier is maintained across a region of the first ion trap in order to confine ions axially within the first ion trap, wherein the amplitude of the axial DC potential barrier and/or the axial pseudo-potential barrier at least partially determines the first charge capacity and wherein if the first charge capacity is exceeded then at least some excess ions will overcome the axial DC potential barrier and/or the axial pseudo-potential barrier and will emerge from the first ion trap.

The mass spectrometer preferably further comprises a deflection lens and an ion detector arranged downstream of the first ion trap, wherein the deflection lens is operated in a first mode of operation so as to deflect any ions which emerge axially from the first ion trap when the first charge capacity is exceeded onto the ion detector and wherein the control system determines that the first charge capacity is approached or exceeded when the ion detector detects ions which have emerged from the first ion trap.

When the control determines that the first charge capacity is approached or exceeded due to the ion detector detecting ions which have emerged from the first ion trap then the deflection lens is then operated in a second mode of operation so as to transmit any ions which subsequently emerge from the first ion trap to the seqond ion trap.

If the first charge capacity is exceeded then at least some excess ions are ejected radially and/or axially from the first ion trap and are detected by an ion detector.

The control system is preferably further arranged and adapted to prevent further ions from entering the first ion trap for a period of time or to attenuate or reduce further ions being transmitted into the first ion trap either:

(i) when the control system determines that the first charge capacity is approached or exceeded; and/or (ii) whilst ions are being transferred from the first ion trap to the second ion trap; and/or (iii) after ions have been transferred from the first ion trap to the second ion trap.

In a mode of operation ions are allowed to enter or fill the first ion trap up to a maximum predetermined fill time period T wherein after the fill time period T ions are substantially prevented from entering the first ion trap for a period of time.

If an ion detector or other device fails to detect any ions emerging from the first ion trap during the predetermined fill time period T then the control system is arranged and adapted:

(i) to prevent further ions from entering the first ion trap for a period of time or to attenuate or reduce further ions being transmitted into the first ion trap; and/or (ii) to transfer ions from the first ion trap to the second ion trap after the predetermined fill time period T.

If an ion detector or other device detects ions emerging from the first ion trap during the predetermined fill time period T at a time T/x then the control system is arranged and adapted:

(i) to prevent further ions from entering the first ion trap for a period of time or to attenuate or reduce further ions being transmitted into the first ion trap; and/or (ii) to transfer ions from the first ion trap to the second ion trap after the time T/x; and/or (iii) to scan or eject ions from the second ion trap; and/or (iv) to scale the intensity of mass spectral data recorded as a result of ions being scanned or ejected from the second ion trap by a factor x.

If an ion detector detects ions emerging from the first ion trap during the predetermined fill time period T at a time T/x then the control system is arranged and adapted:

(i) to prevent further ions from entering the first ion trap for a period of time or to attenuate or reduce further ions being transmitted into the first ion trap; and/or (ii) to transfer ions from the first ion trap to the second ion trap;

(iii) to scan or eject ions from the second ion trap; and/or (iv) to scale the intensity of mass spectral data recorded as a result of ions being scanned or ejected from the second ion trap by a factor (C+D)/C wherein C is the first charge capacity and D corresponds to the number of charges recorded by the ion detector during time T.

According to an embodiment:

(i) the control system is arranged and adapted to allow further ions to accumulate in the first ion trap once ions have been transferred from the first ion trap to the second ion trap; and/or (ii) the control system is arranged and adapted to allow further ions to accumulate in the first ion trap whilst ions are being scanned or ejected from the second ion trap; and/or (iii) the control system is arranged and adapted to cause ions to be mass selectively ejected or scanned out from the second ion trap as ions as being transferred from the first ion trap to the second ion trap; and/or (iv) the control system is arranged and adapted to cause ions to be mass selectively ejected or scanned out from the second ion trap once ions have been transferred from the first ion trap to the second ion trap.

The first charge capacity and the charge capacity of the second ion trap is preferably arranged or set so that when at least some or all ions are transferred from the first ion trap to the second ion trap, the analytical performance of the second ion trap is not substantially compromised and/or the charge capacity of the second ion trap is not substantially exceeded.

The second ion trap preferably comprises an analytical ion trap which is scanned in use in order to mass analyse ions stored within the second ion trap.

According to an embodiment:

(i) in a mode of operation ions are permitted to enter the first ion trap whilst ions are being scanned or otherwise ejected from the second ion trap; and/or (ii) in a mode of operation ions are simultaneously scanned from the second ion trap whilst other ions are arranged to enter or fill the first ion trap.

Ions which are scanned or ejected from the second ion trap are preferably transmitted to an ion detector, mass analyser or another analytical device arranged downstream of the second ion trap.

The mass spectrometer preferably further comprises an attenuation lens or device arranged between the first ion trap and the second ion trap, wherein the attenuation lens or device is preferably arranged and adapted to reduce the intensity of ions which are onwardly transmitted from the first ion trap to the second ion trap.

According to an embodiment the mass spectrometer may further comprise either:

(a) an ion source arranged upstream of the first ion trap, wherein the ion source is selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field. Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; and (xx) a Glow Discharge ("GD") ion source; and/or (b) one or more continuous or pulsed ion sources; and/or (c) one or more ion guides arranged upstream and/or downstream and/or in between the first ion trap and/or the second ion trap; and/or (d) one or more ion mobility separation devices and/or, one or more Field Asymmetric Ion Mobility Spectrometer devices arranged upstream and/or downstream and/or in between the first ion trap and/or the second ion trap; and/or (e) one or more ion traps or one or more ion trapping regions arranged upstream and/or downstream and/or in between the first ion trap and the second ion trap; and/or (f) one or more collision, fragmentation or reaction cells arranged upstream and/or downstream and/or in between the first ion trap and the second ion trap, wherein the one or more collision, fragmentation or reaction cells are selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; (xxix) an Electron Ionisation Dissociation ("EID") fragmentation device; and (xxx) an Electron Detachment Dissociation ("EDD") device wherein electrons are irradiated onto negatively charged parent or analyte ions to cause the parent or analyte ions to fragment; and/or (g) a mass analyser arranged upstream and/or downstream of the second ion trap, wherein the mass analyser is selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers arranged upstream and/or downstream and/or in between the first ion trap and/or the second ion trap; and/or (i) one or more ion detectors arranged upstream and/or downstream and/or in between the first ion trap and the second ion trap; and/or (j) one or more mass filters arranged upstream and/or downstream and/or in between the first ion trap and the second ion trap, wherein the one or more mass filters are selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wein filter; and/or (k) a device or ion gate for pulsing ions into the first ion trap and/or the second ion trap; and/or (l) a device for converting a substantially continuous ion beam into a pulsed ion beam.

According to an embodiment the mass spectrometer may further comprise:

(i) a C-trap and an orbitrap mass analyser comprising an outer barrel-like electrode and a coaxial inner spindle-like electrode, wherein in a first mode of operation ions are transmitted to the C-trap and are then injected into the orbitrap mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the orbitrap mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an aspect of the present invention there is provided a computer program executable by the control system of a mass spectrometer comprising a first ion trap and a second ion trap, the computer program being arranged to cause the control system:

(i) to determine when a charge capacity of the first ion trap is approached or exceeded; and (ii) to transmit at least some or all ions stored within the first ion trap to the second ion trap.

According to an aspect of the present invention there is provided a computer readable medium comprising computer executable instructions stored on the computer readable medium, the instructions being arranged to be executable by a control system of a mass spectrometer comprising a first ion trap and a second ion trap, the computer program being arranged to cause the control system:

(i) to determine when a charge capacity of the first ion trap is approached or exceeded;

(ii) to transmit at least some or all ions stored within the first ion trap to the second ion trap.

The computer readable medium is preferably selected from the group consisting of: (i) a ROM; (ii) an EAROM; (iii) an EPROM; (iv) an EEPROM; (v) a flash memory; (vi) an optical disk; (vii) a RAM; and (viii) a hard drive memory.

According to an aspect of the present invention there is provided a method of mass spectrometry comprising:

providing a first ion trap and a second ion trap;

determining when a charge capacity of the first ion trap is approached or exceeded; and transmitting at least some or all ions stored within the first ion trap to the second ion trap.

According to an aspect of the present invention there is provided a mass spectrometer comprising:

a first ion trap and a second ion trap arranged downstream of the first ion trap; and a control system which is arranged and adapted:

(i) to allow ions to enter the first ion trap for a predetermined period of time, wherein the first ion trap is arranged to have a first charge capacity and wherein if the first charge capacity is exceeded during the predetermined period of time then excess ions will emerge from or otherwise be ejected from the first ion trap; and (ii) to transfer at least some or all ions stored within the first ion trap to the second ion trap after the predetermined period of time.

According to an embodiment the first charge capacity and the charge capacity of the second ion trap is arranged or set so that when at least some or all ions are transferred from the first ion trap to the second ion trap then the analytical performance of the second ion trap is not substantially compromised and/or the charge capacity of the second ion trap is not substantially exceeded.

The mass spectrometer preferably further comprises an attenuation lens or device arranged between the first ion trap and the second ion trap, wherein the attenuation lens or device is preferably arranged and adapted to reduce the intensity of ions which are onwardly transmitted from the first ion trap to the second ion trap.

According to an aspect of the present invention there is provided a method of mass spectrometry comprising:

providing a first ion trap and a second ion trap arranged downstream of the first ion trap;

allowing ions to enter the first ion trap for a predetermined period of time, wherein the first ion trap is arranged to have a first charge capacity and wherein if the first charge capacity is exceeded during the predetermined period of time then excess ions will emerge from or otherwise be ejected from the first ion trap; and transferring at least some or all ions stored within the first ion trap to the second ion trap after the predetermined period of time.

The method preferably further comprises arranging or setting the first charge capacity and the charge capacity of the second ion trap so that when at least some or all ions are transferred from the first ion trap to the second ion trap then the analytical performance of the second ion trap is not substantially compromised and/or the charge capacity of the second ion trap is not substantially exceeded.

According to an aspect of the present invention there is provided a mass spectrometer comprising a first ion trap, wherein:

(i) the first ion trap is initially operated in a first mode of operation wherein ions are accumulated within the first ion trap and wherein the first ion trap is arranged to have a first charge capacity such that if the first charge capacity is exceeded then excess ions emerge or are otherwise ejected from the first ion trap; and then (ii) the first ion trap is subsequently operated in a second mode of operation wherein ions trapped within the first ion trap are mass or mass to charge ratio selectively ejected or scanned from the first ion trap.

According to an embodiment:

(a) the first charge capacity is set at: (i) <10000 charges; (ii) 10000-15000 charges; (iii) 15000-20000 charges; (iv) 20000-25000 charges; (v) 25000-30000 charges; (vi) 30000-35000 charges; (vii) 35000-40000 charges; (viii) 40000-45000 charges; (ix) 45000-50000 charges; and (x) >50000 charges; and/or (b) the first charge capacity in the first mode of operation is arranged or set so that when the first ion trap is operated in the second mode of operation the analytical performance of the first ion trap is not substantially compromised and/or the charge capacity of the first ion trap is not substantially exceeded.

The mass spectrometer preferably further comprises a control system wherein:

(i) if the control system determines that the first charge capacity is approached or exceeded and/or that excess ions have emerged or have been otherwise ejected from the first ion trap then the control system is arranged and adapted to prevent further ions from entering the first ion trap for a period of time or to attenuate or reduce further ions being transmitted into the first ion trap; and/or (ii) if the control system determines that the first charge capacity is approached or exceeded and/or that excess ions have emerged or have been otherwise ejected from the first ion trap then the control system is arranged and adapted to perform an analytical scan of the first ion trap; and/or (iii) the control system is arranged and adapted to allow further ions to enter the first ion trap after an analytical scan of the first ion trap has been performed.

According to an aspect of the present invention there is provided a method of mass spectrometry comprising:

providing a first ion trap;

initially operating the first ion trap in a first mode of operation wherein ions are accumulated within the first ion trap and wherein the first ion trap is arranged to have a first charge capacity such that if the first charge capacity is exceeded then excess ions emerge or are otherwise ejected from the first ion trap; and then subsequently operating the first ion trap in a second mode of operation wherein ions trapped within the first ion trap are mass or mass to charge ratio selectively ejected or scanned from the first ion trap.

According to an embodiment:

(a) the first charge capacity is set at: (i) <10000 charges; (ii) 10000-15000 charges; (iii) 15000-20000 charges; (iv) 20000-25000 charges; (v) 25000-30000 charges; (vi) 30000-35000 charges; (vii) 35000-40000 charges; (viii) 40000-45000 charges; (ix) 45000-50000 charges; and (x) >50000 charges; and/or (b) the first charge capacity in the first mode of operation is arranged or set so that when the first ion trap is operated in the second mode of operation the analytical performance of the first ion trap is not substantially compromised and/or the charge capacity of the first ion trap is not substantially exceeded.

According to an embodiment:

(i) if it is determined that the first charge capacity is approached or exceeded and/or that excess ions have emerged or have been otherwise ejected from the first ion trap then further ions are prevented from entering the first ion trap for a period of time or further ions being transmitted into the first ion trap are attenuated or reduced; and/or (ii) if it is determined that the first charge capacity is approached or exceeded and/or that excess ions have emerged or have been otherwise ejected from the first ion trap then an analytical scan of the first ion trap is performed; and/or (iii) the method further comprises allowing further ions to enter the first ion trap after an analytical scan of the first ion trap has been performed.

The preferred embodiment relates to a means of controlling the population of ions within a mass selective ion trap in which the analytical performance of the ion trap is dependent upon the number of charges present prior to recording a mass spectrum.

According to the preferred embodiment a further ion trap is arranged upstream of the analytical ion trap and the further ion trap is preferably arranged to transmit or transfer at least a portion of the population of ions contained in the further ion trap to the mass selective ion trap.

According to an embodiment one or more ion detectors may be arranged to detect at least a portion of ions which may be lost from the further ion trap once the charge capacity limit of the further ion trap has been exceeded.

According to one embodiment the charge capacity of the further ion trap may be controlled by setting one or more RF and/or DC voltages associated with the further ion trap.

In one embodiment the proportion of ions that are transmitted or transferred from the further ion trap to the mass selective or analytical ion trap may be controlled by one or more electrodes arranged between the two ion traps. The electrodes may be arranged to transmit or transfer all of, or a fraction of, the ions from the further ion trap to the mass selective ion trap. The electrodes may be arranged to have a required or preferred transmission efficiency and/or to transmit ions for a required or preferred period of time.

According to a less preferred embodiment the analytical ion trap and the further ion trap may comprise the same physical device which is operated sequentially under different conditions.

According to an embodiment a separate mass filter may be placed upstream of the further ion trap and/or between the two ion traps and/or downstream of the mass selective or analytical ion trap. For example, a quadrupole mass filter may be positioned upstream of the further ion trap to allow selection of a restricted mass to charge ratio range of ions.

A collision gas cell or other fragmentation device may be located upstream of the further ion trap and/or in the intermediate region between the two ion traps and/or downstream of the mass selective or analytical ion trap. For example, a gas collision cell may be placed in the intermediate region between the two ion traps to allow fragmentation of ions exiting the further ion trap.

BRIEF DESCRIPTION OF THE DRAWINGS

Various embodiments of the present invention will now be described, by way of example, and with reference to the accompanying drawings in which.

DETAILED DESCRIPTION OF THE PREFERRED EMBODIMENTS

Figure 1:
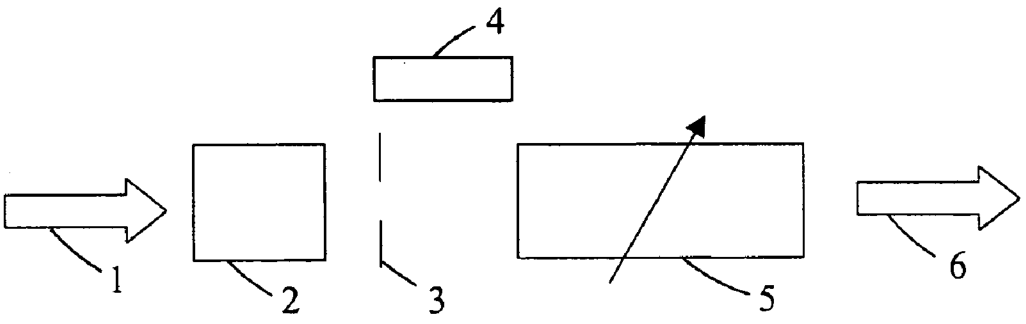
FIG. 1 shows an embodiment of the present invention comprising a first ion trap arranged upstream of a second or analytical ion trap.

A preferred embodiment of the present invention will now be described with reference to FIG. 1. Ions 1 from an ion source are preferably introduced into a first ion trap 2. The ion trap 2 preferably includes a means of control of the total number of charges which can be contained within the ion trap 2 without significant loss. The means of control preferably comprises a DC and/or RF potential barrier.

The ion source may comprise a pulsed ion source such as a Laser Desorption Ionisation ("LDI") ion source, a Matrix Assisted Laser Desorption Ionisation ("MALDI") ion source or a Desorption Ionisation on Silicon ("DIOS") ion source.

Alternatively, and more preferably, a continuous ion source may be used in which case an additional ion trap (not shown) may be provided upstream of the ion trap 2. The additional ion trap may be used to store ions and then periodically release ions. Continuous ion sources which may be used include an Electrospray Ionisation ("ESI") ion source, an Atmospheric Pressure Chemical Ionisation ("APCI") ion source, an Electron Impact ("EI") ion source, an Atmospheric Pressure Photon Ionisation ("APPI") ion source, a Chemical Ionisation ("CI") ion source, a Desorption Electrospray Ionisation ("DESI") ion source, an Atmospheric Pressure MALDI ("AP-MALDI") ion source, a Fast Atom Bombardment ("FAB") ion source, a Liquid Secondary Ion Mass Spectrometry ("LSIMS") ion source, a Field Ionisation ("FI") ion source and Field Desorption ("FD") ion source. Other continuous or pseudo-continuous ion sources may also be used.

According to an embodiment the ions 1 which are transmitted to the first ion trap 2 may be transmitted from a separate analytical device or fragmentation device arranged upstream of the ion trap 2.

Ions from the ion source are preferably arranged to enter the ion trap 2 and the ions are preferably prevented from exiting the ion trap 2 by the presence of a barrier potential. The barrier potential may comprise a DC potential or a pseudo-potential (which may be created by modulating an inhomogeneous field at RF frequency). A buffer gas may be present in the ion trap 2 in order to facilitate collisional cooling of ions to near thermal energies.

Once the charge capacity of the ion trap 2 has been reached, the force on the ions due to coulombic repulsion is preferably such that some ions will begin to overcome the trapping potential. As a result, excess ions will leak or otherwise emerge from the first ion trap 2. The ions which leak or emerge from the ion trap 2 may be monitored, for example, by an ion detector 4. According to an embodiment the ion detector 4 may be located downstream and orthogonal to the ion trap 2. A deflection lens 3 may be provided and may be used to direct excess ions exiting the ion trap 2 so that the excess ions are incident upon the ion detector 4.

The point at which ions start to exit or leak from the ion trap 2 is preferably related to the amount of charge and not the number of ions present within the ion trap 2. Therefore, the same charge will preferably reside within the ion trap 2 regardless of the charge state of the ions confined within the ion trap 2.

A second or analytical ion trap 5 is preferably positioned downstream of the first ion trap 2. In a preferred mode of operation the maximum charge capacity of the first ion trap 2 is preferably set to be less than the maximum number of charges allowable for acceptable performance of the analytical ion trap 5. The deflection lens 3 is preferably initially set to direct any excess ions which exit the first ion trap 2 onto the ion detector 4. Ions are preferably allowed to enter the first ion trap 2 until a time at which ions are recorded by the ion detector 4. Detection of ions at the ion detector 4 preferably indicates that the charge capacity of the first ion trap 2 has been exceeded. At this time further ions are preferably prevented from entering the ion trap 2. The potentials applied to the deflection lens 3 are then preferably modified so that any ions which subsequently emerge from the ion trap 2 are preferably transmitted direct to the analytical ion trap 5. Ions are then preferably stored within the analytical ion trap 5. Ions are then preferably selectively ejected from the analytical ion trap 5 according to their mass or mass to charge ratio. The ejected ions 6 are preferably transmitted to an ion detector or to another analytical device which is preferably arranged downstream of the analytical ion trap 5.

Ions from the ion source may be allowed to refill the ion trap 2 during the analytical scan of the analytical ion, trap 5 whilst monitoring excess ions using the ion detector 4. Simultaneous scanning of the analytical ion trap 5 and filling of the first ion trap 2 preferably maximises the duty cycle of the experiment.

In this mode of operation the time for the ion trap 2 to be filled will vary depending upon the composition and flux of the incoming ion beam. However, the total charge residing in the analytical ion trap 5 will preferably be substantially the same for each analytical scan. According to the preferred embodiment the charge will preferably not exceed a level at which the performance of the analytical ion trap 5 becomes compromised.

In a second mode of operation a predetermined maximum filling time T for the first ion trap 2 may be set. If during and after the filling time T no excess ions are detected by the ion detector 4 then the filling of the ion trap 2 is preferably stopped at time T and ions are then preferably passed to the analytical ion trap 5 for analysis. If, however, excess ions are detected after some fraction of the predetermined maximum filling time T, (e.g. T/x where x>1), then filling of the ion trap 2 is preferably stopped at that time T/x and the ions are then preferably passed to the analytical ion trap 5 for analysis. The intensity of the recorded data stored as output from the analytical scan of the analytical ion trap 5 may be scaled directly by the factor x to indicate the average amount of charge which would have entered the ion trap 2 during time T. This scaling allows quantitative information relating to the incoming ion beam to be reflected in the final data.

According to a third mode of operation, a fixed fill time T may be predetermined and the total amount of charge which may have leaked from the ion trap 2 may be estimated from the signal detected by the ion detector 4. If no signal is detected by the ion detector 4 during time T then no scaling is preferably applied to the data produced during the analytical scan of the analytical ion trap 5. If the charge capacity of the ion trap 2 has been set at a number of charges C and a signal corresponding to D number of charges is recorded by ion detector 4 during time T, then the resultant data may be scaled by a factor (C+D)/C.

According to a further less preferred mode of operation, during a fixed predetermined fill time T, the signal is preferably not monitored by ion detector 4. The limited charge capacity of the ion trap 2 ensures that the maximum amount of total charge passed to the analytical ion trap 5 is less than the maximum amount allowable for acceptable analytical performance. However, in this embodiment the average amount of charge entering the ion trap 2 during time T is not determined and therefore no scaling may be applied to the recorded data.

Figure 2:
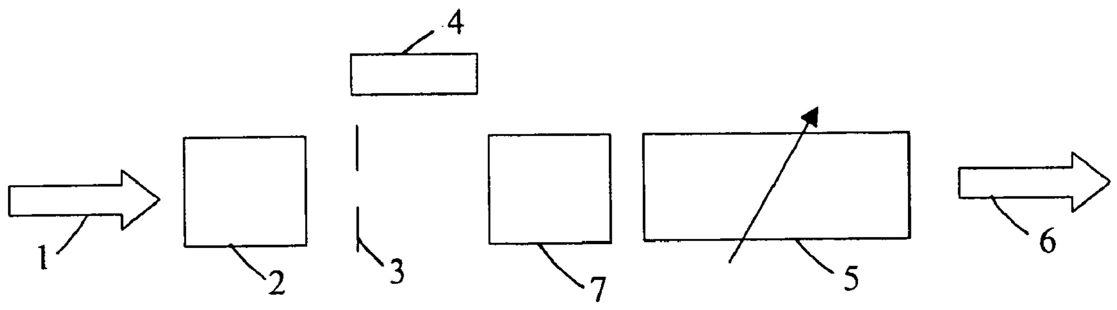
FIG. 2 shows another embodiment of the present invention wherein a fragmentation device is provided between the first ion trap and the second or analytical ion trap.

Another embodiment of the present invention is shown in FIG. 2 wherein a fragmentation device 7 is provided in an intermediate region between the first ion trap 2 and the second or analytical ion trap 5.

According to an embodiment the preferred ion trap may comprise a means for controlling the total number of charges which can be contained without significant loss and may be the same physical device as the analytical ion trap. For example, the ion trap may comprise a linear quadrupole ion trap capable of radial and/or axial mass selective ejection. In this embodiment the analytical ion trap is operated sequentially in two separate modes. In a first mode, the total charge capacity of the analytical ion trap is modified initially to be the same value as that required for acceptable performance during an analytical scan of the same ion trap. This may be achieved, for example, by altering trapping potentials. Ions are allowed to accumulate in the ion trap until the charge capacity is reached. Any excess ions may be detected using an external ion detector. At this point ion accumulation is preferably stopped. The electrostatic potentials are then preferably altered to allow an analytical scan of the ion trap to be performed. In this embodiment accumulation of the ions can only proceed once the analytical scan is completed.

The modes of operation described previously may be applied to an embodiment wherein a single device may be used both to accumulate a predetermined ion population and to subsequently affect an analytical scan.

Figure 3:
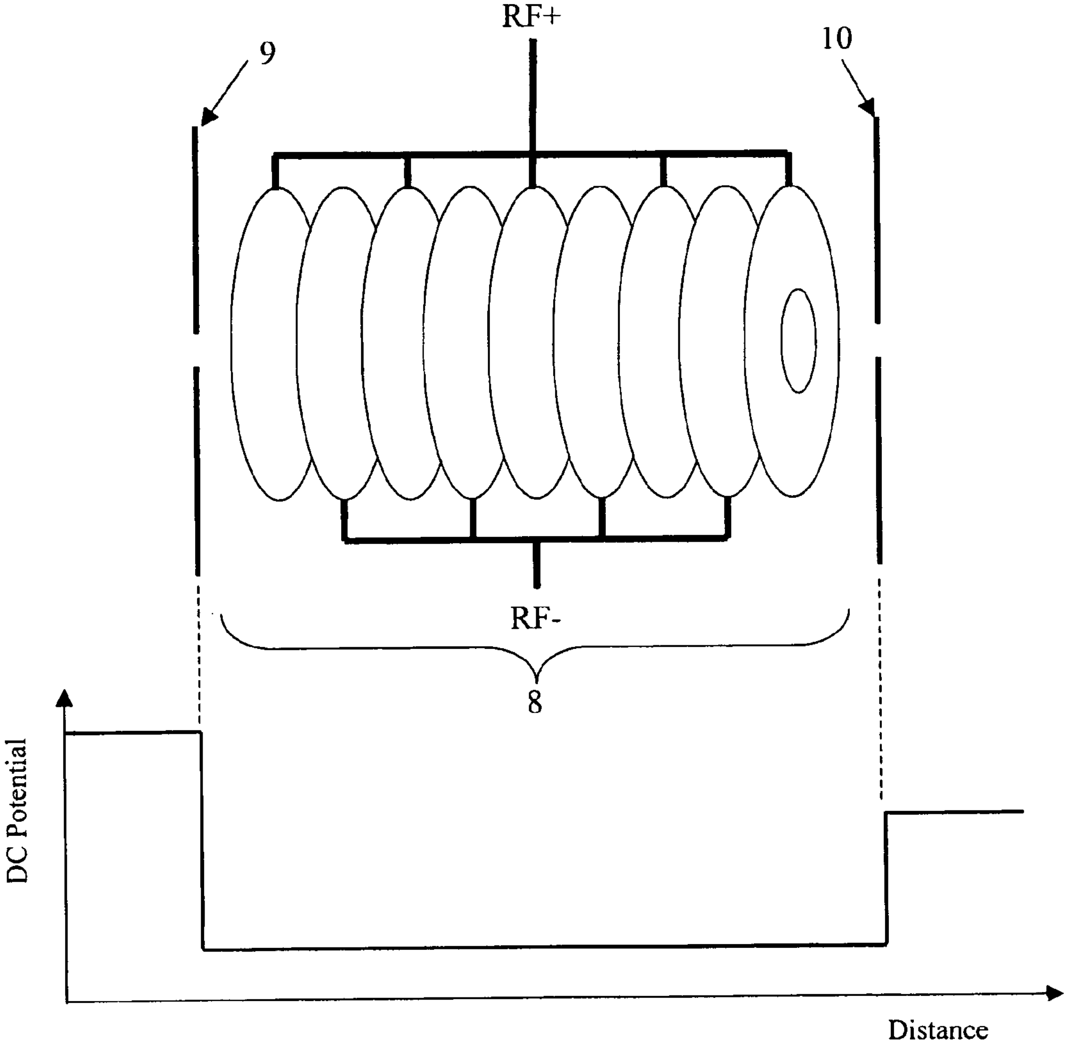
FIG. 3 shows an ion trap according to an embodiment of the present invention wherein a DC potential controls the total charge which may be contained within the ion trap without significant loss.

FIG. 3 shows an example of an ion trap with means of control of the total number of charges which can be contained without significant loss. The ion trap comprises an ion tunnel ion trap 8 comprising a series of annular electrodes. The electrical potential of the annular electrodes is preferably modulated at an RF frequency. Opposite phases of an AC voltage are preferably applied to adjacent plates or electrodes. The AC potential preferably results in a pseudo-potential which acts to confine or trap ions in the radial direction. In addition to AC potentials the annular plates or electrodes may also be supplied with an additional DC potential.

An entrance plate 9 and an exit plate 10 are preferably supplied with a DC potential only. The plot of DC potential versus distance shows the general form of the DC applied to the entrance plate 9, exit plate 10 and the annular electrodes. The DC potential preferably serves to trap ions in the axial direction within the ion trap until the force due to coulombic repulsion of trapped ions is sufficient to overcome the confining field. It is assumed that the radial confining force is greater than the axial confining force for each different ion species present in the trap.

Ions preferably enter the ion trap 8 through or via entrance plate 9. The ions preferably accumulate within the ion trap 8 until the charge capacity of the ion trap 8 is exceeded. The relative magnitude of the radial pseudo-potential compared to the magnitude of the axial DC trapping potential is preferably arranged such that when the charge capacity of the ion trap 8 is exceeded, ions will start to exit the ion trap 8 via the exit plate 10 i.e. in an axial direction.

For linear ion traps using inhomogeneous RF fields to confine ions to the central axis of the ion trap, the radial pseudo-potential barrier V. is proportional to the ratio (z/m) and the effective radial confining force $F_r$* is proportional to the ratio ($z^2$/m) regardless of the physical form of the linear ion trap. In other words, for a quadrupole, hexapole, octopole, multi-pole or ring stack ion guide:

$$V_r^* = k_1 \cdot (z/m) \quad (1)$$

$$F_r^* = k_2 \cdot (z^2/m) \quad (2)$$

wherein m is the mass of the ion, z is the number of electronic charges and $k_1$ and $k_2$ are constants dependent on the geometrical form and size of the ion guide and on the amplitude and frequency of the applied RF voltage.

However, if $V_a$ is the DC potential applied to the exit plate 10 of the ion trap then the force $F_a$ due to the axial confining DC voltage applied to the exit plate 10 is directly proportional to the charge z of the ion:

$$F_a = k_3 \cdot z \quad (3)$$

wherein $k_3$ is a constant which is dependent upon the geometrical form and size of the ion guide and exit plate and upon the DC potential $V_a$ applied to the exit plate 10.

In a preferred embodiment, the axial force $F_a$ is less than the effective radial force $F_r^*$ for all ion species present regardless of their mass m and their electronic charge z. This ensures that when ions start to leak from the ion trap 8 then they will leak in an axial direction. Furthermore, ions will start to leak only after the charge capacity of the ion trap 8 is reached and will, to a first approximation at least, be independent of the mass and/or mass to charge ratio of the ions present in the ion trap.

As a consequence of these relationships between $V_r^*$, $V_a$, $F_r^*$, $F_a$, m and z, if ions are captured in the ion trap 8 and are allowed time to cool to thermal energies then ions having relatively low mass to charge ratio values or higher charge state will start to become concentrated closer to the central axis of the ion trap 8 than ions having relatively high mass to charge value or lower charge states. Ions of higher charge state will additionally start to reside further from the exit and entrance barriers in the axial direction. However, whilst ions are being injected into the ion trap 8 it is believed that it is unlikely that this segregation effect will have time to occur and mass and charge dependent displacement of ions will be minimal.

Figure 4A:
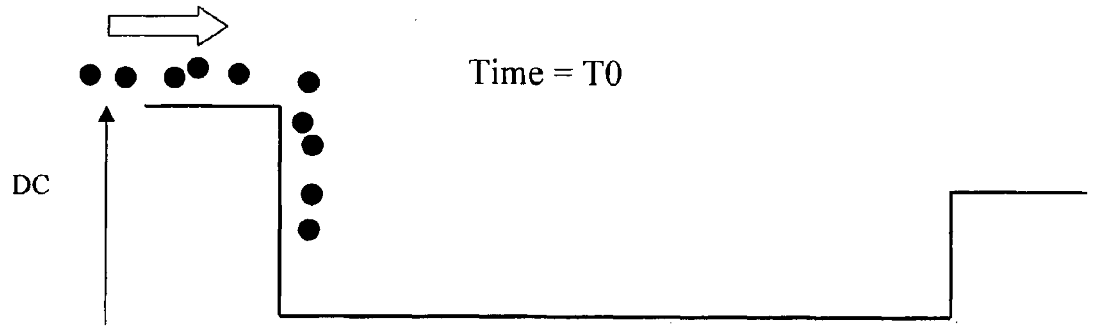
FIG. 4A shows a representation of ion accumulation within the ion trap shown in FIG. 3 at time T0.
Figure 4B:
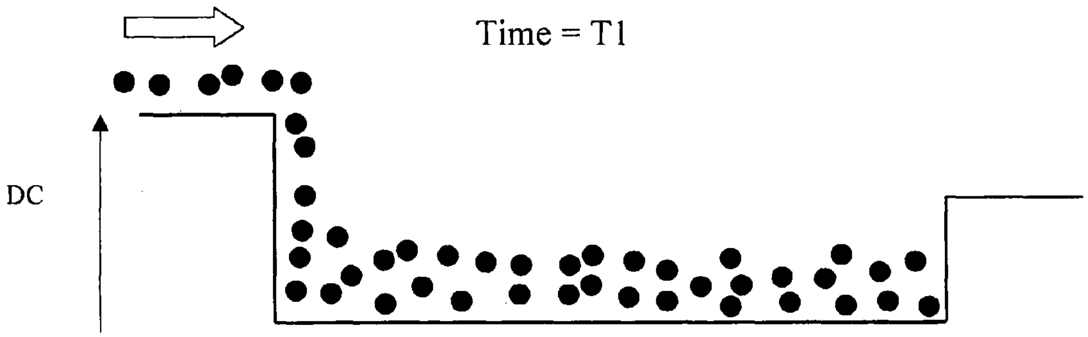
FIG. 4B shows a representation of ion accumulation within the ion trap shown in FIG. 3 at time T1 and FIG. 4C shows a representation of ion accumulation within the ion trap shown in FIG. 3 at time T2.
Figure 4C:
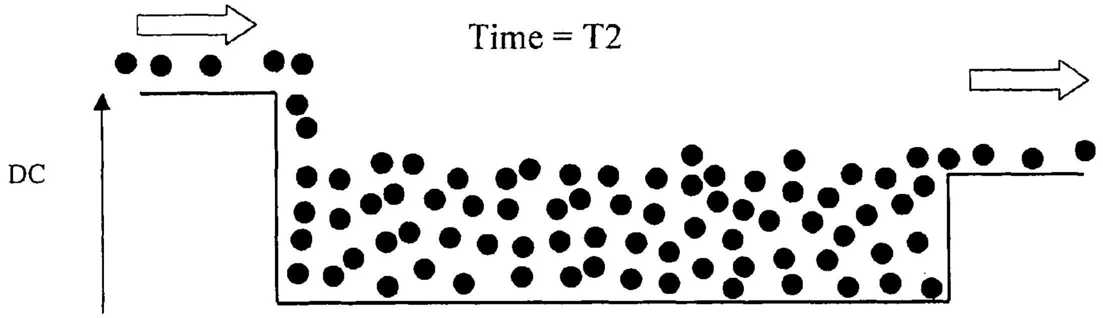

FIG. 4A shows a representation of ion accumulation within the axial DC well of the ion trap 8 and shows ions entering the trapping region at time T0. FIG. 4B shows ions accumulating in the trapping region at a later time T1 (T1>T0). FIG. 4C shows ions exiting the ion trap at a yet later time T2 (T2>T1) when the charge capacity of the ion trap 8 has been exceeded.

Figure 5:
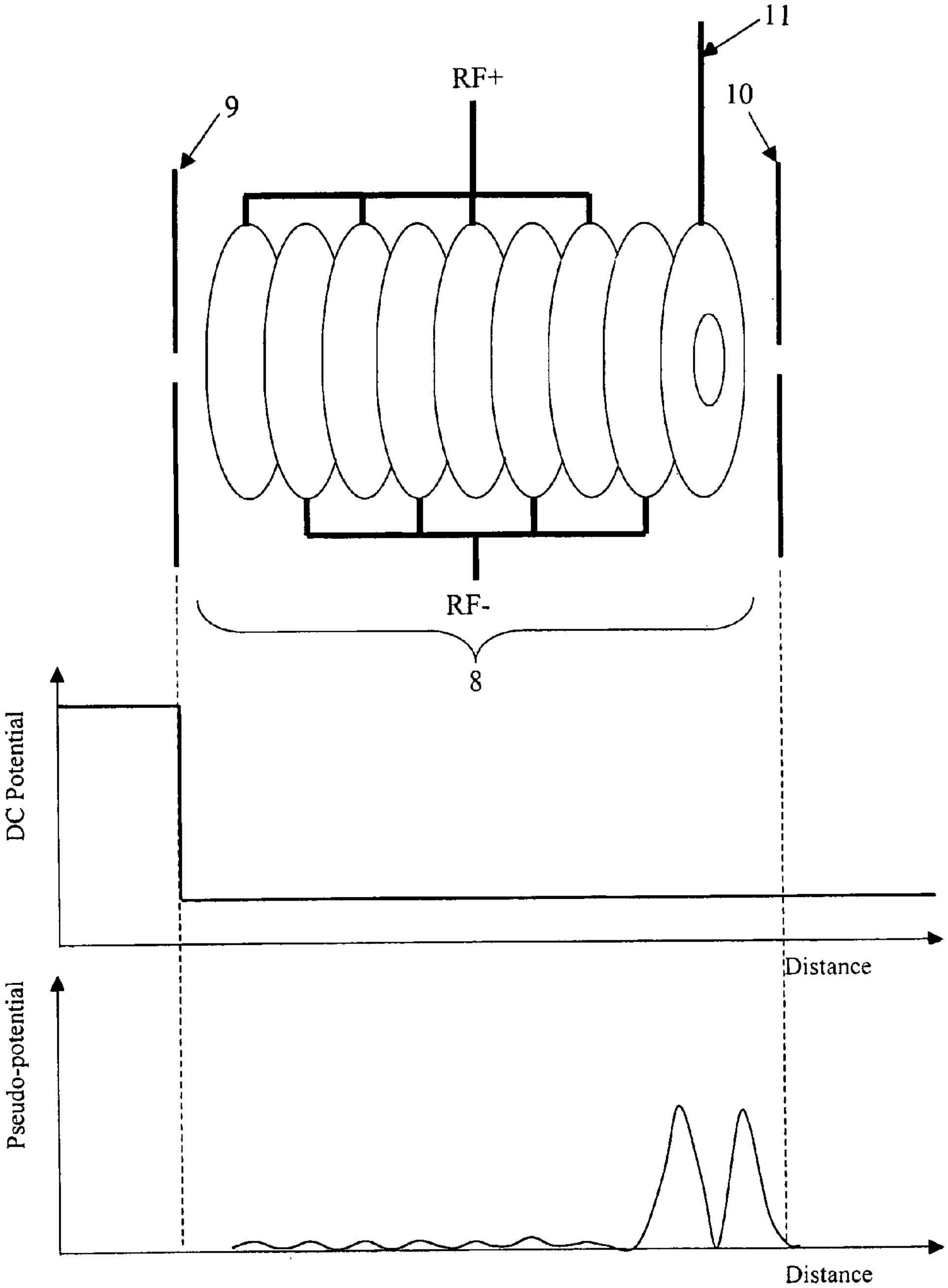
FIG. 5 shows an ion trap according to an embodiment of the present invention wherein an RF potential controls the total charge which may be contained within the ion trap without significant loss.

FIG. 5 shows an ion trap 8 according to a less preferred embodiment wherein the ion trap 8 comprises means of control of the total number of charges which can be contained without significant loss. The ion trap 8 preferably comprises an ion tunnel ion trap 8 comprising a series of annular electrodes to which electrical potentials modulated at RF frequency are applied. Opposite phases of AC voltage are preferably applied to adjacent plates in order to confine ions radially.

The plot of DC potential versus distance shows the form of the DC potentials applied to the entrance plate 9, the annular plate electrodes 8 and the exit plate 10. An annular plate at the end of the ion tunnel 8 is shown supplied by an independent AC potential 11. Application of a higher amplitude of modulated potential to this plate electrode results in a pseudo-potential barrier being formed at the exit of the ion trap 8. The general form of the axial pseudo-potential created by this arrangement is shown in the plot of pseudo-potential versus distance. A series of shallow axial corrugations are formed by application of opposite phases of AC potential with the same amplitude to neighbouring electrodes. However, increasing the amplitude of the AC potential applied to electrode 11 results in a higher field in this region and thus a larger pseudo-potential.

Ions entering the ion trap 8 through or via entrance plate 9 are preferably prevented from exiting through or via exit plate 10 by this pseudo-potential barrier until the force due to coulombic repulsion of trapped ions is sufficient to overcome the confining field.

In this embodiment the force preventing ions from exiting the ion trap 8 is dependent on mass and charge in the same way as the radial confining force. Ions of lower mass to charge ratio may be confined to a smaller radius and further from the exit aperture compared to ions of higher mass to charge ratio. These ions will experience a larger pseudo-potential barrier than ions of higher mass to charge ratio. Therefore, in this embodiment the total trapped charge at which ions start to exit the ion trap 8 will be more dependent on the composition of the ion population.

It should be noted that a pseudo-potential barrier may be formed by decreasing the internal radius of the annular plates or varied by changing the phase difference between neighbouring plates.

Figure 6:
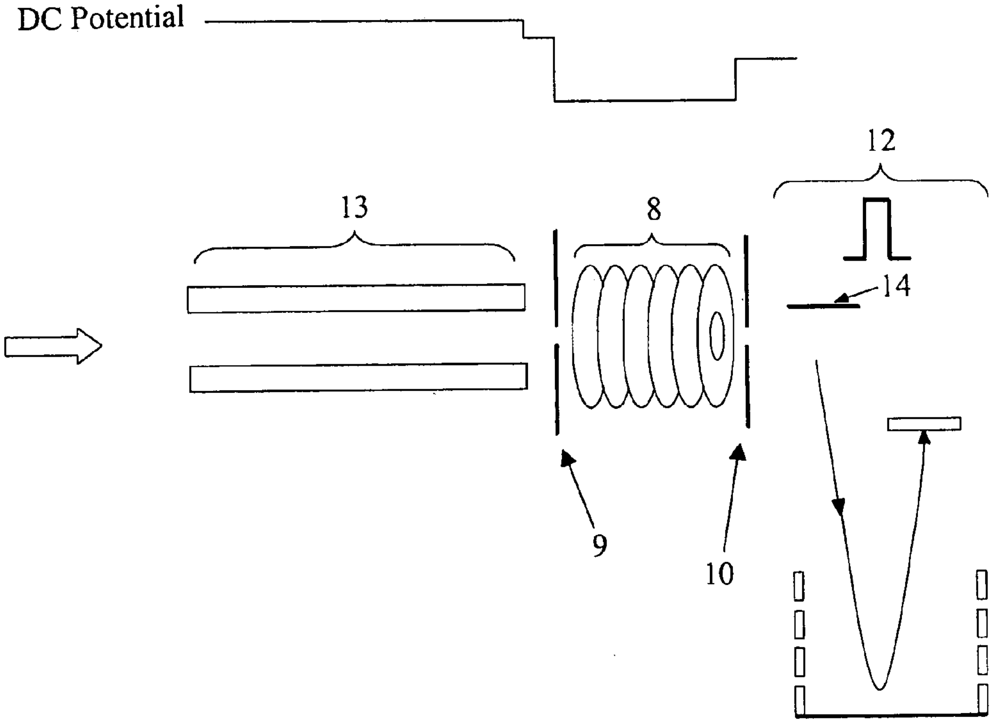
FIG. 6 shows an ion trap according to an embodiment of the present invention coupled to a Time of Flight mass analyser.

FIG. 6 shows an ion trap as shown in FIG. 3 coupled to an orthogonal acceleration Time of Flight mass spectrometer 12 comprising an extraction electrode 14. An experiment was conducted wherein a continuous beam of positive ions was introduced from an Electrospray Ionisation ion source. The ions from the ion source passed through a quadrupole mass filter 13 which could be set either to transmit ions having a narrow mass to charge ratio range or which could be operated in a RF only band pass mode of operation. Ions were then arranged to enter a stacked ring ion trap 8 which included a means to control of the total number of charges which can be contained without significant loss. The ion trap 8 was maintained at a pressure of approximately $5\times10^{-3}$ mbar of Argon.

FIG. 6 also shows a representation of the DC potential applied to the components during accumulation of ions within the ion trap 8. The quadrupole mass filter 13 was operated at 6V above ground potential and the entrance lens 9 of the ion trap was set to 5V above ground potential. The electrodes of the stacked ring ion trap 8 were maintained at 0 V. The exit plate 10 potential was varied between 0.7 V to 1.5 V to vary the charge capacity of the ion trap 8. The stacked ring ion trap 8 was 187 mm long and had an internal diameter of 5 mm. The stacked ring ion trap 8 was supplied with an AC voltage of 280 V peak to peak at a frequency of 2 MHz.

The exit plate DC 10 of the ion trap 8 was set between 0.7 and 1.5 V and ions were accumulated within the stacked ring ion trap 8 until a signal was seen using the orthogonal acceleration Time of Flight detector 12 indicating that the charge capacity of the ion trap 8 had been exceeded. At this time, the incoming beam of ions was interrupted by lowering the electrospray capillary voltage to 0 V. The exit lens 10 potential was then set to 0 V to allow the stored ions within the ion trap 8 to exit the stacked ring ion trap 8. The ions which exited the ion trap 8 were then recorded using the Time of Flight mass analyser 12.

Figure 7:
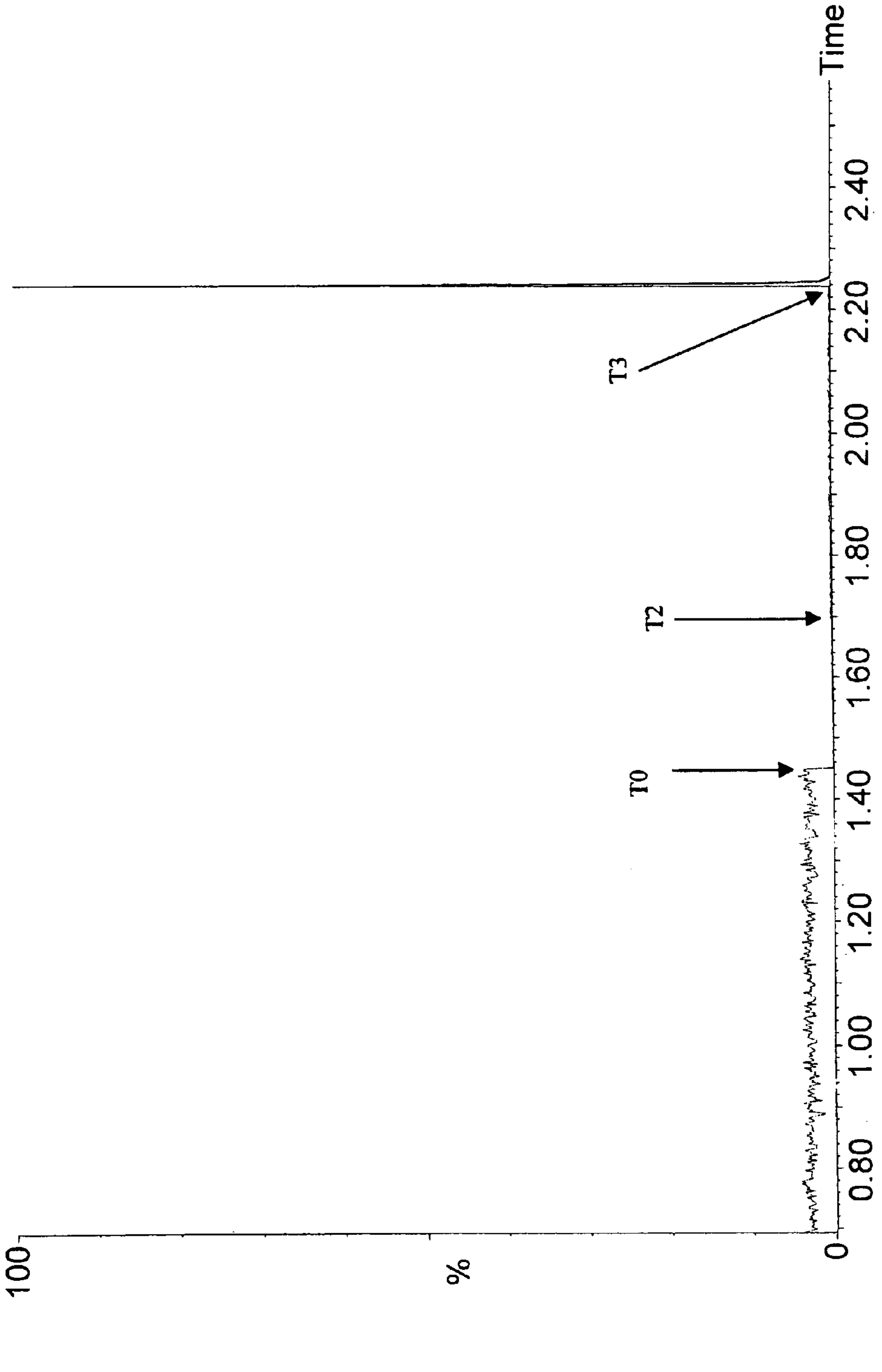
FIG. 7 shows a mass chromatogram obtained using apparatus as shown in FIG. 6.

FIG. 7 shows the results from a single experiment described above. A small amount of sodium formate was added to a 2 ng/ul solution of leucine enkephalin and was continuously infused at 2 ul/min into the Electrospray Ionisation ion source. Ions from the isotope cluster of Leucine enkephalin having a mass to charge ratio of 578 were isolated using the quadrupole mass filter 13. A reconstructed mass chromatogram of mass to charge ratio 578 is shown in FIG. 7.

At time T0 the potential of the exit lens 10 was raised to 1V at which point ions begin to accumulate in the stacked ring ion trap 8. No signal was observed until subsequent time T2 at which time the electrospray capillary voltage was set to 0 V thereby preventing further ions from being generated and hence effectively preventing ions leaving the ion source. At time T3 the exit lens 10 potential was reduced to 0 V thereby allowing ions to exit the ion trap 8. The ions exiting the ion trap 8 were then recorded.

From the known transmission of the system from the exit lens 10 to the time of flight detector 12 the capacity of the stacked ring ion trap 8 under these conditions was estimated to be $5\times10^6$ charges.

Figure 8:
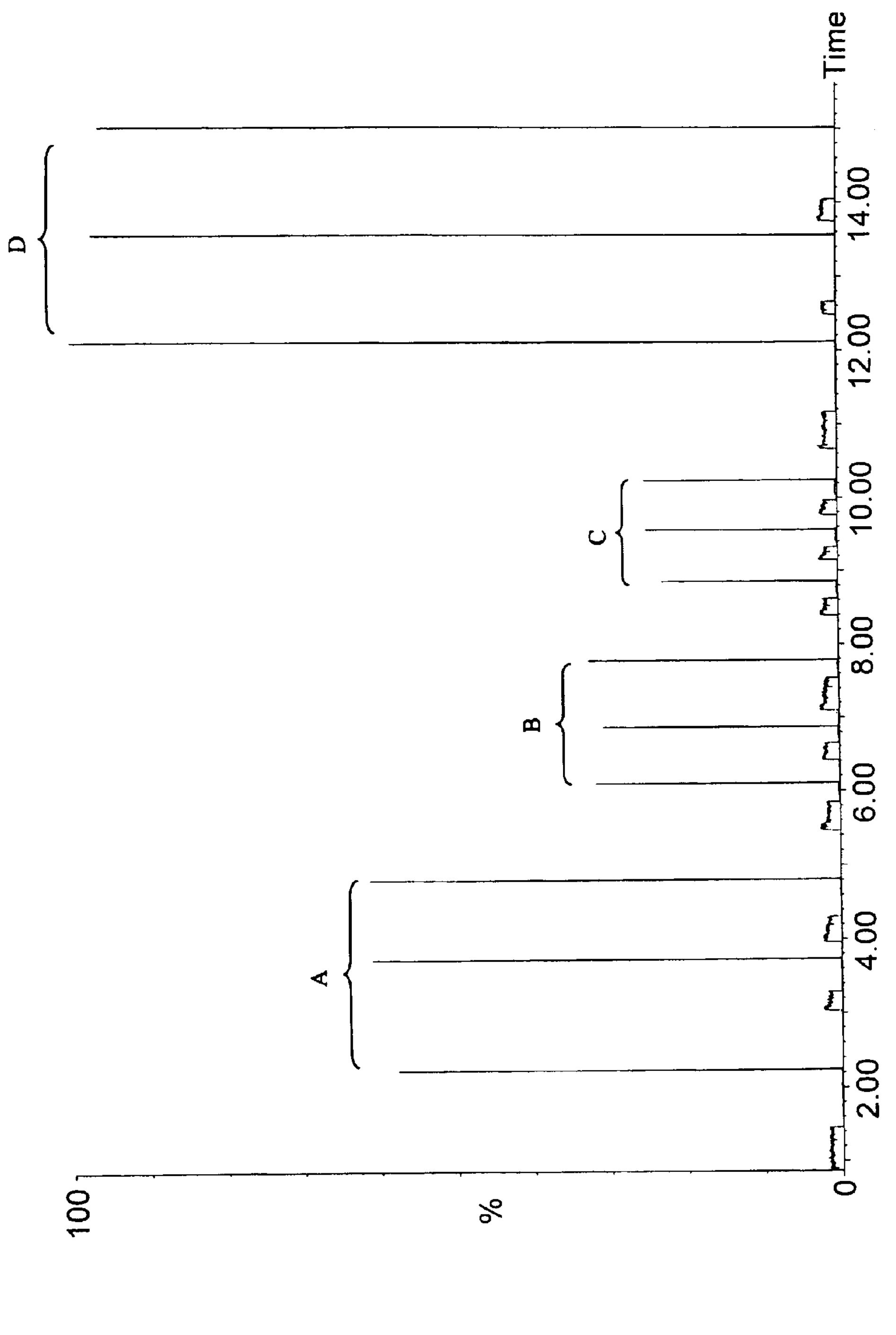
FIG. 8 shows a mass chromatogram obtained using apparatus as shown in FIG. 6.

FIG. 8 shows reconstructed mass chromatograms of ions having a mass to charge ratio of 578 for repeat experiments using the method described above in relation to FIG. 7 but with differing exit lens potentials being applied to the exit lens 10. The flux of ions entering the ion trap 8 during the trapping process remained constant for each result. The three results marked A were obtained using an exit lens potential during ion trapping of 1 V. The three results marked B were obtained using an exit lens potential during ion trapping of 0.75 V. The three results marked C were obtained using an exit lens potential during ion trapping of 0.7 V. The three results marked D were obtained using an exit lens potential during ion trapping of 1.5 V.

It is apparent that as the trapping potential is decreased then the charge capacity of the stacked ring ion trap 8 is also reduced. For the same input rate ions overflow the exit barrier and are detected after a shorter period of time.

Figure 9:
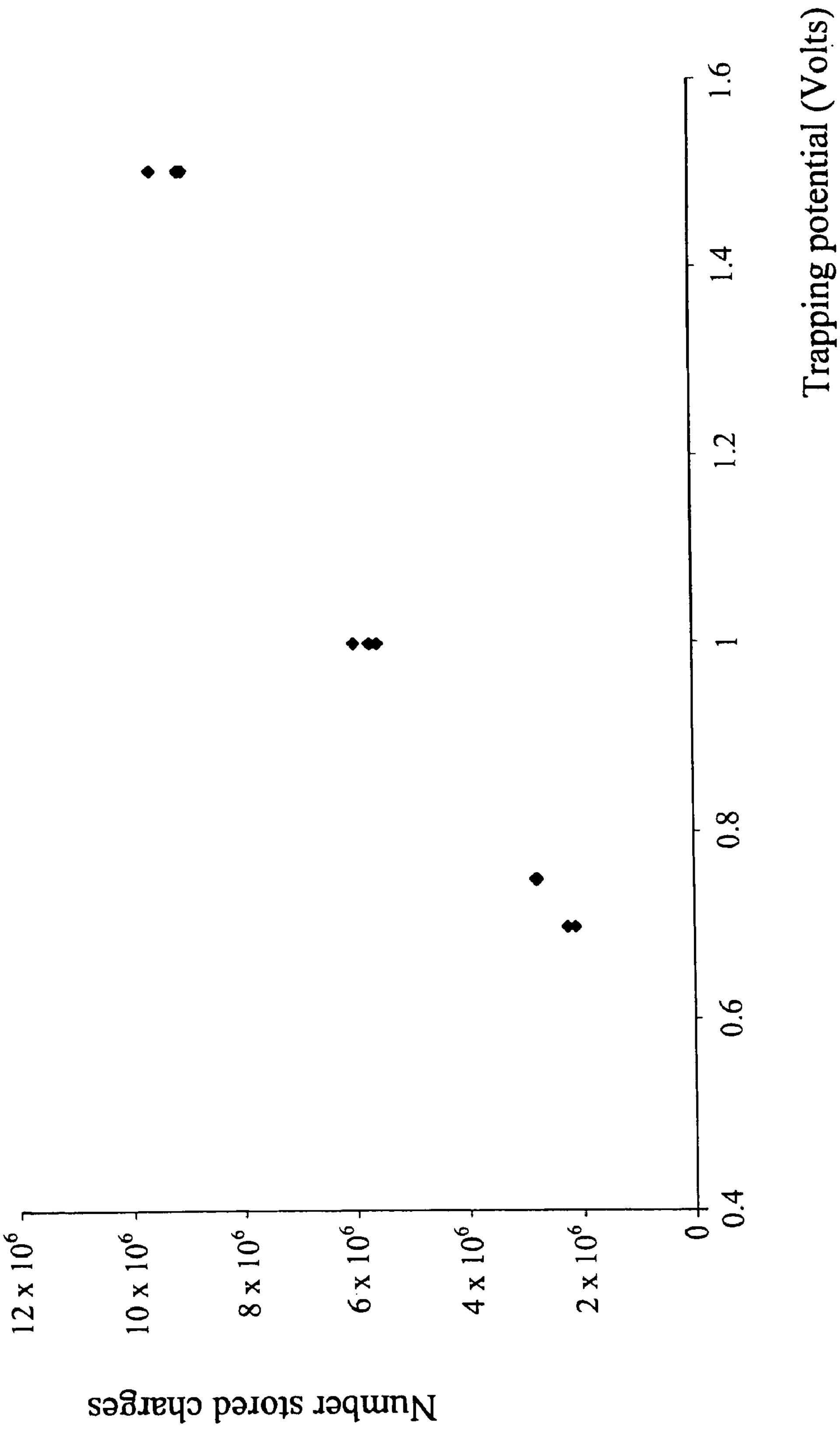
FIG. 9 shows a plot of the number of stored charges versus trapping potential.

FIG. 9 shows a plot of the estimated number of charges stored versus the potential applied to the exit plate 10 for the data shown in FIG. 8.

Figure 10:
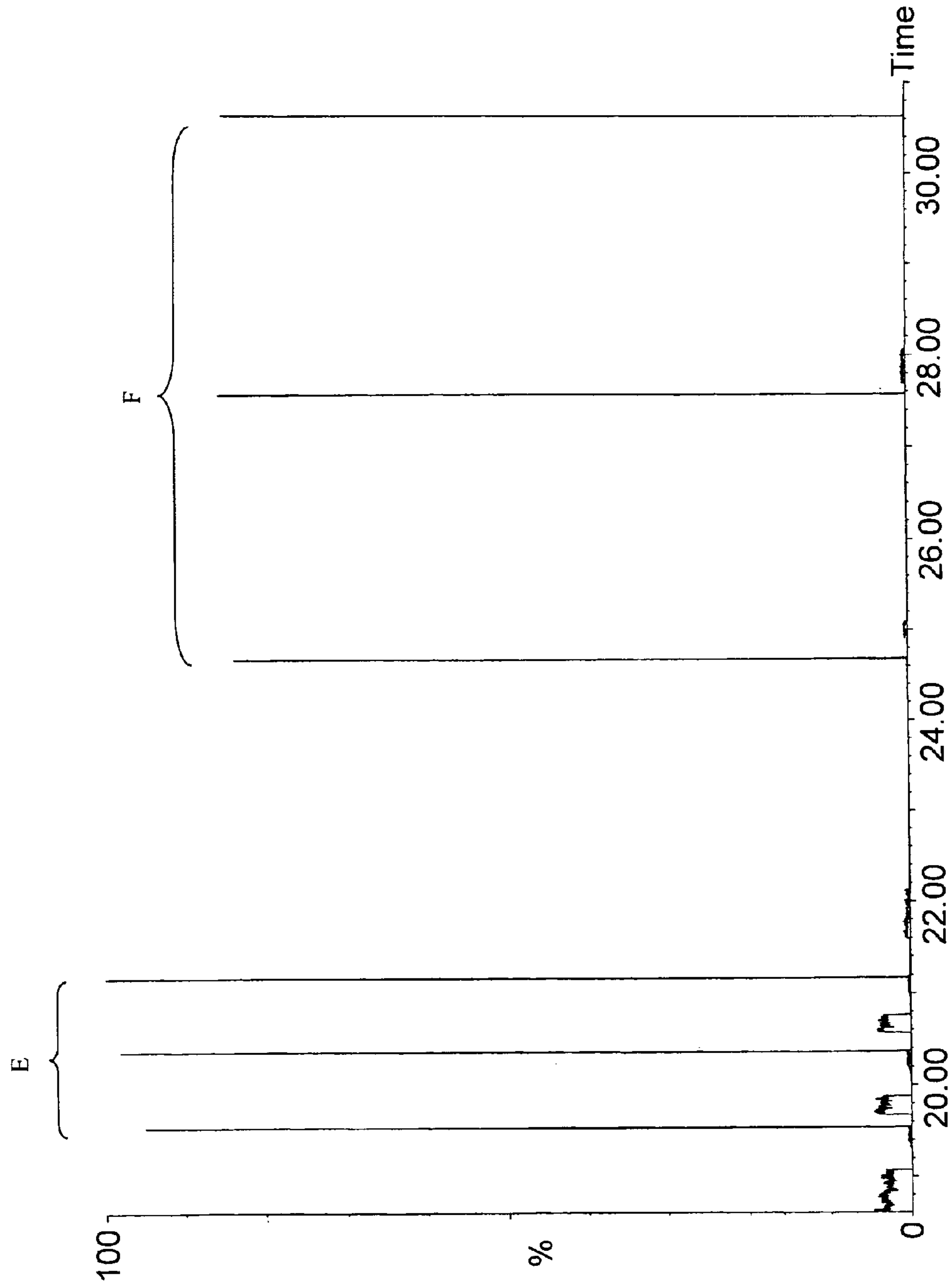
FIG. 10 shows a further mass chromatogram obtained using apparatus as shown in FIG. 6.

FIG. 10 shows a second set of results using the same experimental apparatus described. In this case results marked E is a repeat of the previous result with a trapping potential on exit plate 10 of 1 V. The average time to fill the ion trap for the three measurements was 14 seconds. The average maximum number of charges trapped was $6\times10^6$. For the three results marked F the trapping voltage on exit plate 10 was left at 1V but the incoming ion flux was attenuated by a factor of approximately ×10. The average time to fill the trap for the three measurements marked F was 117 seconds. The average maximum number of charges trapped was $4.7\times10^6$. In this experiment the average time to fill the ion trap 8 increased by a factor of ×8 and the recorded number of stored charges decreased to 0.78 of that in the previous experiment. Within the experimental error, this data demonstrates that the preferred method may be used to collect a target number of ions within the ion trap 8 regardless of the incoming ion flux.

Further embodiments are contemplated. For example, with reference to FIG. 1, depending upon the configuration of the ion trap 2, the ion detector 4 may be positioned to collect ions exiting the ion trap 2 radially. According to an embodiment the ion detector 4 may be positioned axially upstream of the analytical ion trap 5. In this case, during filling of the ion trap 2 the analytical ion trap 5 may be set to transmit any ions which exit the ion trap 2 for detection.

According to another embodiment the ion trap 2 may comprise an RF multipole (e.g. a quadrupole, hexapole or octopole) wherein either DC or pseudo-potential barriers may be provided in order to axially contain ions.

According to another less preferred embodiment the ion trap 2 may comprise a segmented flat plate ion guide wherein the plates are arranged in a sandwich formation with the plane of the plates being parallel to the axis of the ion guide and wherein RF voltages are applied between neighbouring plates.

According to an embodiment an attenuation lens or device may be provided between the ion trap 2 and the analytical ion trap 5 in order to control, modulate, alter or reduce the intensity of ions which are transmitted from the ion trap 2 to the analytical ion trap 5.

Although the present invention has been described with reference to preferred embodiments, it will be understood by those skilled in the art that that various changes in form and detail may be made without departing from the scope of the invention as set forth in the accompanying claims.

The invention claimed is:

1. A mass spectrometer comprising:

a first ion trap and a second ion trap arranged downstream of said first ion trap; and a control system which is arranged and adapted:

(i) to allow ions to enter said first ion trap for a predetermined period of time, wherein said first ion trap is arranged to have a first charge capacity and wherein if said first charge capacity is exceeded during said predetermined period of time then excess ions will emerge from or otherwise be ejected from said first ion trap; and (ii) to transfer at least some or all ions stored within said first ion trap to said second ion trap after said predetermined period of time;

wherein said second ion trap has a second charge capacity, and the ratio of said second charge capacity to said first charge capacity is >1; and wherein said first charge capacity and the charge capacity of said second ion trap is arranged or set so that when at least some or all ions are transferred from said first ion trap to said second ion trap, the analytical performance of said second ion trap is not substantially compromised or the charge capacity of said second ion trap is not substantially exceeded.

2. A mass spectrometer as claimed in claim 1, wherein:

(i) said first ion trap or said second ion trap comprise a quadrupole, hexapole or octapole rod set ion trap, a linear or 2D ion trap, a 3D ion trap comprising a central ring electrode and two end-cap electrodes, or a mass selective rod set ion trap; or (ii) said first ion trap or said second ion trap comprise an ion tunnel ion trap comprising a plurality of electrodes, each electrode comprising one or more apertures through which ions are transmitted in use; or (iii) said first ion trap and/or said second ion trap comprise an ion guide comprising a plurality of planar electrodes arranged generally in the plane of ion transmission, wherein said plurality of planar electrodes are axially segmented.

3. A mass spectrometer as claimed in claim 1, wherein:

(a) said first charge capacity is set at: (i)<10000 charges; (ii) 10000-15000 charges; (iii) 15000-20000 charges; (iv) 20000-25000 charges; (v) 25000-30000 charges; (vi) 30000-35000 charges; (vii) 35000-40000 charges; (viii) 40000-45000 charges; (ix) 45000-50000 charges; and (x)>50000 charges; or (b) said second ion trap has a second charge capacity, wherein said second charge capacity is set at: (i)<10000 charges; (ii) 10000-15000 charges; (iii) 15000-20000 charges; (iv) 20000-25000 charges; (v) 25000-30000 charges; (vi) 30000-35000 charges; (vii) 35000-40000 charges; (viii) 40000-45000 charges; (ix) 45000-50000 charges; and (x)>50000 charges; or ( c) said second ion trap has a second charge capacity, wherein the ratio of said second charge capacity to said first charge capacity is selected from the group consisting of: (i) 1-1.5; (ii) 1.5-2.0; (iii) 2.0-2.5; (iv) 2.5-3.0; (v) 3.0-3.5; (vi) 3.5-4.0; (vii) 4.0-4.5; (viii) 4.5-5.0;(ix) 5.0-6.0; (x) 6.0-7.0; (xi) 7.0-8.0; (xii) 8.0-9.0; (xiii) 9.0-10.0; and (xiv)>10.0.

4. A mass spectrometer as claimed in claim 1, wherein in a mode of operation an axial DC potential barrier or an axial pseudo-potential barrier is maintained across a region of said first ion trap in order to confine ions axially within said first ion trap, wherein the amplitude of said axial DC potential barrier or said axial pseudo-potential barrier at least partially determines said first charge capacity and wherein if said first charge capacity is exceeded then at least some excess ions will overcome said axial DC potential barrier or said axial pseudo-potential barrier and will emerge from said first ion trap.

5. A mass spectrometer as claimed in claim 1, further comprising a deflection lens and an ion detector arranged downstream of said first ion trap, wherein said deflection lens is operated in a first mode of operation so as to deflect any ions which emerge axially from said first ion trap when said first charge capacity is exceeded onto said ion detector and wherein said control system determines that said first charge capacity is approached or exceeded when said ion detector detects ions which have emerged from said first ion trap.

6. A mass spectrometer as claimed in claim 5, wherein when said control determines that said first charge capacity is approached or exceeded due to said ion detector detecting ions which have emerged from said first ion trap then said deflection lens is then operated in a second mode of operation so as to transmit any ions which subsequently emerge from said first ion trap to said second ion trap.

7. A mass spectrometer as claimed in claim 1, wherein if said first charge capacity is exceeded then at least some excess ions are ejected radially or axially from said first ion trap and are detected by an ion detector.

8. A mass spectrometer as claimed in claim 1, wherein said control system is further arranged and adapted to prevent further ions from entering said first ion trap for a period of time or to attenuate or reduce further ions being transmitted into said first ion trap either:

(i) when said control system determines that said first charge capacity is approached or exceeded; or (ii) whilst ions are being transferred from said first ion trap to said second ion trap; or (iii) after ions have been transferred from said first ion trap to said second ion trap.

9. A mass spectrometer as claimed in claim 1, wherein in a mode of operation ions are allowed to enter or fill said first ion trap up to a maximum predetermined fill time period T wherein after said fill time period T ions are substantially prevented from entering said first ion trap for a period of time.

10. A mass spectrometer as claimed in claim 9, wherein if an ion detector or other device fails to detect any ions emerging from said first ion trap during said predetermined fill time period T then said control system is arranged and adapted:

(i) to prevent further ions from entering said first ion trap for a period of time or to attenuate or reduce further ions being transmitted into said first ion trap; or (ii) to transfer ions from said first ion trap to said second ion trap after said predetermined fill time period T.

11. A mass spectrometer as claimed in claim 9, wherein if an ion detector or other device detects ions emerging from said first ion trap during said predetermined fill time period T at a time T/x then said control system is arranged and adapted:

(i) to prevent further ions from entering said first ion trap for a period of time or to attenuate or reduce further ions being transmitted into said first ion trap; or (ii) to transfer ions from said first ion trap to said second ion trap after said time T/x; or (iii) to scan or eject ions from said second ion trap; or (iv) to scale the intensity of mass spectral data recorded as a result of ions being scanned or ejected from said second ion trap by a factor x.

12. A mass spectrometer as claimed in claim 9, wherein if an ion detector detects ions emerging from said first ion trap during said predetermined fill time period T at a time T/x then said control system is arranged and adapted:

(i) to prevent further ions from entering said first ion trap for a period of time or to attenuate or reduce further ions being transmitted into said first ion trap; or (ii) to transfer ions from said first ion trap to said second ion trap;

(iii) to scan or eject ions from said second ion trap; or (iv) to scale the intensity of mass spectral data recorded as a result of ions being scanned or ejected from said second ion trap by a factor (C+D)/C wherein C is said first charge capacity and D corresponds to the number of charges recorded by said ion detector during time T.

13. A mass spectrometer as claimed in claim 1, wherein:

(i) said control system is arranged and adapted to allow further ions to accumulate in said first ion trap once ions have been transferred from said first ion trap to said second ion trap; or (ii) said control system is arranged and adapted to allow further ions to accumulate in said first ion trap whilst ions are being scanned or ejected from said second ion trap; or (iii) said control system is arranged and adapted to cause ions to be mass selectively ejected or scanned out from said second ion trap as ions as being transferred from said first ion trap to said second ion trap; or (iv) said control system is arranged and adapted to cause ions to be mass selectively ejected or scanned out from said second ion trap once ions have been transferred from said first ion trap to said second ion trap.

14. A mass spectrometer as claimed in claim 1, further comprising an attenuation lens or device arranged between said first ion trap and said second ion trap, wherein said attenuation lens or device is arranged and adapted to reduce the intensity of ions which are onwardly transmitted from said first ion trap to said second ion trap.

15. A method of mass spectrometry comprising:

providing a first ion trap and a second ion trap arranged downstream of said first ion trap;

allowing ions to enter said first ion trap for a predetermined period of time, wherein said first ion trap is arranged to have a first charge capacity and wherein if said first charge capacity is exceeded during said predetermined period of time then excess ions will emerge from or otherwise be ejected from said first ion trap; and transferring at least some or all ions stored within said first ion trap to said second ion trap after said predetermined period of time;

wherein said second ion trap has a second charge capacity, and the ratio of said second charge capacity to said first charge capacity is >1; and arranging or setting said first charge capacity and the charge capacity of said second ion trap so that when at least some or all ions are transferred from said first ion trap to said second ion trap then the analytical performance of said second ion trap is not substantially compromised or the charge capacity of said second ion trap is not substantially exceeded.

* * * * *